Oct. 6, 1964  E. CHAPMAN  3,151,693
WEIGHING DEVICES
Filed April 3, 1962
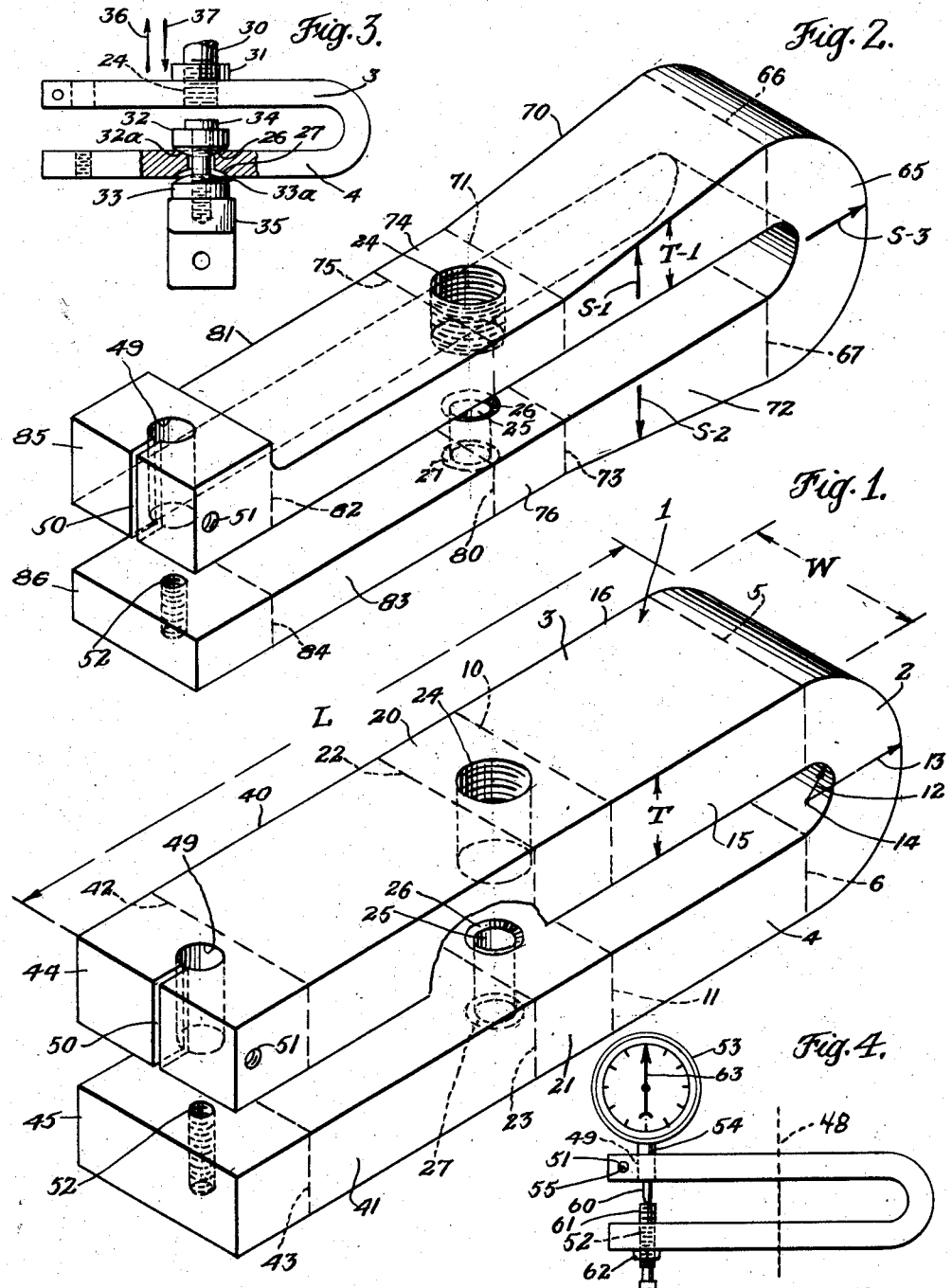
INVENTOR
Everett Chapman
BY
Synnestvedt & Lechner
ATTORNEYS

United States Patent Office 3,151,693
Patented Oct. 6, 1964

3,151,693
WEIGHING DEVICES
Everett Chapman, P.O. Box 207, West Chester, Pa.
Filed Apr. 3, 1962, Ser. No. 184,790
3 Claims. (Cl. 177—234)

This invention relates to weighing devices and in particular relates to improvements in weighing devices of the type where the force or applied load causes the device to deflect through a certain displacement with the displacement being a function of or proportional to the amount of force or load.

The principal object of the invention is to provide a weighing device which is linearly responsive to small changes in load over a wide load range.

The preferred form of the invention contemplates a piece of elastic material formed into a U-shape and arranged for the legs of the U to be moved toward or away from one another by the load or force applying means, together with a mechanical arrangement to amplify the arm motion and adapted to transfer this amplified motion to a sensing or measuring device.

Typical embodiments of the invention and the various advantages thereof will be described below in connection with the following drawings, wherein:

FIGURE 1 is an isometric view of one embodiment of the invention;

FIGURE 2 is an isometric view of another embodiment of the invention;

FIGURE 3 is a side elevational view showing a typical arrangement for applying a force to the device; and FIGURE 4 is a side elevational view showing an arrangement for detecting the displacement of the device under load.

In FIGURE 1 a piece of elastic material 1 has a U-shape. The material is preferably made of aluminum alloy or steel and is formed by machining a solid block or forging or extruding to the configuration shown and as described hereinafter. The U-shape is constituted as by a loop section 2 and leg sections 3 and 4. To delineate the extent of the loop and leg sections, I have indicated on the drawing the dotted lines 5 and 6 which respectively define the ends of the loop section and one end of the leg sections 3 and 4 respectively connected to the ends of the loop. The outer ends of the leg sections 3 and 4 are represented by the dotted lines 10 and 11. The inner side of the loop is formed as by a radius 12 and the outer side of the loop by a radius 13. The center of each radius is at 14 and this center lies in the plane containing the dotted lines 5 and 6 or the ends of the loop section. The leg 3 is formed as by two parallel edges, one of which is indicated at 15 and upper and lower parallel sides, the upper of which is indicated at 16.

The leg sections 3 and 4 carry sections 20 and 21. The extent of section 20 is indicated by the dotted line 10 and also by the dotted line 22. The extent of section 21 is indicated by the dotted line 11 and by the dotted line 23. The section 20 is provided with a threaded aperture 24. Section 21 has an aperture 25 which terminates at the top by a semi-spherical bearing seat 26 and on the bottom by a semi-spherical bearing seat 27. The sections 20 and 21, the threaded aperture 24 and the aperture 25 with its seats 26 and 27 constitute connecting means which provide for connecting a force applying mechanism to each of the legs.

The connecting means shown are especially useful in instances where the device is employed in a photoelastic machine, for example, a machine of the kind shown in my copending application, Serial No. 184,827 entitled Improved Photoelastic Machine. A typical arrangement for this purpose is shown in FIGURE 3 and described below.

The threaded aperture 24 mounts a threaded stud 30 which is held in place by the nut 31. As shown in the above referred to application, the threaded stud 30 is adapted to be connected to a piston (of a piston and cylinder arrangement) by means of which the stud or piston rod is moved in the vertical direction. The seats 26 and 27 on the section 21 are adapted respectively to seat the semi-spherical members 32 or 33 disposed on a threaded stud 34 secured to the bracket 35. As shown in said application, the bracket 35 is adapted to be fastened to one end of a test specimen, the other end of which is fixed.

When the machine of said application is operated to put the specimen in tension, the piston is moved upwardly (arrow 36) carrying the stud and device upwardly until the seat 26 and semi-spherical surface 32a interengage as shown. To apply load to the specimen, upward piston movement is continued. The movement is resisted by the device and the reaction is transferred to the specimen connected to the bracket 35. The load in the device, of course, tends to spread the arms 3 and 4. As will be explained later, this arm motion which is proportioned to load is detected and indicated.

When the machine of said application is operated to put a specimen in compression, the piston is moved in a downward direction (arrow 37). Under compression conditions, the seat 27 and semi-spherical surface 33a interengage and the arms are moved toward each other.

I have found it to be of considerable advantage for detecting or measuring the leg motion, to provide means which will amplify the actual motion of the legs. For this purpose, I have formed the device with amplifying arms 40 and 41, the arm 40 being connected to the section 20 (at area 22) and the arm 41 being connected to the section 21 (at area 23). The two arms 40 and 41 follow the motion of the legs 3 and 4; i.e., when the legs move apart the arms move apart and when the legs move together, the arms move together. When the arms and legs are moved apart, the distance separating the ends of the arms 40 and 41 (taken in a plane containing the dotted lines 42 and 43) will be much greater than the distance separating the ends of the two legs 3 and 4 (taken in a plane containing the dotted lines 10 and 11). Thus, for a given load on the device, the larger arm movement is available to actuate some sensing device which operates as a function of displacement. It will be appreciated that the foregoing enhances the sensitivity of the device.

For securing a sensing means to the device, I have included a section 44 on the arm 40 and a section 45 on the arm 41. Section 44 is connected to the end of arm 40 at the area indicated by dotted lines 42. The section 45 is connected to the end of the arm 41 at the area indicated by the dotted lines 43. The section 44 has an aperture 49 and is split as by the slot 50. The aperture 51 is for a set screw used to close and open the slot 50. The section 45 has a threaded aperture 52. This construction is for use when the device is connected with a photoelastic machine of the kind shown in the above-mentioned application, and a dial indicator constitutes the sensing or measuring means. The dial indicator may be connected as shown in FIGURE 4 where it will be seen that the indicator 53 has a shaft 54 fitting into the aperture 49. A set screw 55 in the aperture 51 closes the slot 50 and holds the stem tightly in place. The follower 60 of the indicator rests on a screw 61 fitted into the aperture 52. The screw is held in a desired adjusted position as by the nut 62. In FIGURE 4 a load applying means such as described in FIGURE 3, is indicated by the dotted lines 48.

The dial indicator is the type wherein the pointer 63 is capable of moving clockwise or counterclockwise from a zero position, depending upon the movement of the follower 60. Thus in the particular arrangement when the arms are moved toward or away from one another, this motion is transferred to the pointer 63 which then indicates the amount of movement.

Before closing the description of the embodiment of FIGURE 1, it is pointed out that the axes of the apertures 24, 25, 49 and 52 all lie in a plane which is midway between the sides.

The embodiment of the invention described above has many highly desirable advantages. One significant advantage of the invention is that the configuration produces a linear response over a wide load range and provides a usable response to relatively small changes in load.

Another advantage is in the ease of manufacture. The configuration shown can be easily formed from a plate section of the desired material. The simplicity of the mechanical design makes it relatively easy to construct devices which are essentially duplicates of one another. This is of especial advantage in manufacturing, particularly from the standpoint of testing and calibration. But it is also of value in field use in that it promotes the interchangeability of weighing devices.

Additionally, it will be seen that the length L and width W of the device can be easily altered to suit particular designs. Further, it will be noted that the radii 12 and 13 can be easily changed as well as the thickness T of the leg and arm sections. This, of course, is highly advantageous from the standpoint of being able to provide an extremely wide variety of devices of different sensitivities and load ranges. Also, the configuration of the device lends itself to high accurate machining.

Another advantage of the device rising out of its mechanical configuration is that it is extremely rugged and need not be handled as a delicate instrument, even though it actually serves that function. Thus the scale or spring rate of the device (load/displacement) is not affected as by inadvertent dropping in use or in shipping.

Another advantage of the device is that its relatively massive configuration makes it insensitive to the normal ambient temperature changes which are present in scientific laboratories and in many types of production lines. This is important from the stand point of maintaining constant and known calibration.

Another advantage of the device is the simplicity with which the device can be connected to the load applying mechanism. As will be apparent, this connection can be solid and positive so as to eliminate an undesirable end effect which could cause non-linearity. Furthermore, the design provides that arm and leg motion are free from rotational or buckling tendencies which could introduce friction or other distortions and hence affect the linearity.

All of the advantages mentioned above are also gained in the embodiment of the invention shown in FIGURE 2. The embodiment shown in FIGURE 2 is for those applications which it is necessary to accurately measure extraordinary small increments of load, for example, in so-called split-fringe techniques in photoelastic work.

The configuration shown in FIGURE 2 is such that the internal stresses developed in the device (upon the application of load) are substantially uniform in both the loop and leg sections. Under these conditions, I have been able to obtain a much greater arm motion for a given load without raising critical stresses. This condition of uniform internal stress is brought about by making the leg sections tapered, the taper extending in a direction away from the loop section. This is explained below.

In FIGURE 2 the loop section 65 is formed by radii the same as the radii 12 and 13 in FIGURE 1. The loop section is bounded by the dotted lines 66. An upper leg section 70 is bounded by the dotted lines 66 and 71 and a lower leg section 72 is bounded by the dotted lines 67 and 73. The upper leg 70 has connected means 74 bounded by the dotted lines 71 and 75. The lower leg 72 has connecting means 76 bounded by the dotted lines 73 and 80. The upper connecting means 74 has an amplifying arm 81 bounded by the dotted lines 75 and 82. The lower connecting means 76 has amplifying arm 83 which is bounded by the dotted lines 80 and 84. The upper arm 81 has connecting means 85 which is similar in construction to the connecting means 44 in FIGURE 1 and the lower arm 83 has conncting means 86 which is similar in construction to the connecting means 45 in FIGURE 1.

It will be observed that the thickness T–1 of the leg 70 is greater at the joinder area indicated by the dotted lines 66 than at the joinder area 71 where it joins the connecting means 74. Thus the leg has a taper which decreases in a direction away from the loop section. The lower leg 72 is similarly configured.

With the above-mentioned configuration, I have found that the various internal stresses indicated by the arrows S–1, S–2 and S–3 are substantially constant in the loop and leg sections. This means that the device is free from undesirable concentrations of stress in localized areas. I have discovered that by providing for substantially constant stress around the loop and leg sections, I am able to increase the spring rate per unit of maximum stress of the device and to obtain a much greater deflection or motion of the leg sections with a given load without permanent distortion at higher loads. This feature is of great importance because it not only greatly improves the sensitivity of the instrument but additionally provides a means for detecting very small changes in load.

In closing it is pointed out that ideal configuration of the legs 70 and 72 is parabolic. However, the taper configuration as shown provides for a stress distribution which is no nearly equal that of a parabolic configuration that the additional cost of machining a parabolic shape is not justified for the usual application of the instrument.

I claim:
1. A weighing device comprising:
a piece of elastic material of generally rectangular cross section having a U-shaped form, the U-shape being constituted by a loop section and two leg sections respectively connected to and extending away from the ends of the loop, each leg being tapered in a direction away from the loop section; and
connecting means respectively on each leg section adjacent the end thereof providing for connecting force applying mechanism to the leg for use in relatively moving the legs toward and away from one another.

2. A weighing device comprising:
a piece of elastic material of generally rectangular cross section having a U-shaped form, the U-shape being constituted by a loop section and two leg sections respectively connected to and extending away from the ends of the loop, each leg being tapered in a direction away from the loop section;
connecting means respectively on each leg section adjacent the end thereof providing for connecting force applying mechanism to the leg for use in relatively moving the legs toward and away from one another;
a pair of elongated amplifying arms respectively connected to and extending away from said connecting means; and
second connecting means on each said amplifying arm and spaced from first said connecting means providing for connecting sensing mechanism between the arms to sense the said movement of the arms.

3. A weighing device comprising:
a piece of elastic material having U-shaped form, the U-shape being constituted by a loop section and two leg sections respectively connected to and extending away from the ends of the loop, each leg being tapered in a direction away from the loop section; and connecting means respectively on each leg section adjacent the end thereof providing for connecting force applying mechanism to the leg for use in relatively moving the legs toward and away from one another, said loop section and said leg sections having a cross sectional configuration providing for the development of substantially constant, radially directed internal stresses when said legs are moved toward or away from one another.

References Cited in the file of this patent

UNITED STATES PATENTS

| | | |
|---|---|---|
| 2,672,755 | Hohner | Mar. 23, 1954 |
| 2,930,227 | Spademan | Mar. 29, 1960 |

FOREIGN PATENTS

| | | |
|---|---|---|
| 445,345 | Germany | June 3, 1927 |